(12) United States Patent
Shikama (10) Patent No.: US 12,365,037 B2
(45) Date of Patent: Jul. 22, 2025

(54) GUIDE PAD AND GUN DRILL HAVING GUIDE PAD

(71) Applicant: TUNGALOY CORPORATION, Fukushima (JP)

(72) Inventor: Hiroya Shikama, Iwaki (JP)

(73) Assignee: TUNGALOY CORPORATION, Fukushima (JP)

( * ) Notice: Subject to any disclaimer, the term of this patent is extended or adjusted under 35 U.S.C. 154(b) by 196 days.

(21) Appl. No.: 18/295,695

(22) Filed: Apr. 4, 2023

(65) Prior Publication Data

US 2023/0347424 A1 Nov. 2, 2023

(30) Foreign Application Priority Data

May 2, 2022 (JP) ................................. 2022-075666

(51) Int. Cl.
  *B23B 51/04* (2006.01)
  *B23B 41/02* (2006.01)
(52) U.S. Cl.
  CPC .......... *B23B 51/0466* (2013.01); *B23B 41/02* (2013.01); *B23B 2251/56* (2013.01)
(58) Field of Classification Search
  CPC . B23B 51/06; B23B 51/0054; B23B 2229/04; B23B 2251/56; B23D 77/00; B23D 77/02; B23D 77/04; Y10T 408/5586
  See application file for complete search history.

(56) References Cited

U.S. PATENT DOCUMENTS

| 5,697,737 | A | 12/1997 | Danielsson et al. |
| 5,820,318 | A | 10/1998 | Danielsson et al. |
| 8,801,343 | B2 * | 8/2014 | Jaeger ................. B23B 51/0493 408/83 |
| 9,862,035 | B2 * | 1/2018 | Van Doorn ......... B23B 51/0493 |
| 2010/0061817 | A1 * | 3/2010 | Nomura ............. B23B 51/0493 408/83 |
| 2010/0104385 | A1 * | 4/2010 | Nomura ............. B23B 51/0493 408/83 |
| 2013/0136551 | A1 * | 5/2013 | Nisikawa ................ B23B 51/00 408/83 |

(Continued)

FOREIGN PATENT DOCUMENTS

| EP | 2 090 391 A1 | 8/2009 |
| JP | S59-140119 U | 9/1984 |

(Continued)

*Primary Examiner* — Nicole N Ramos
(74) *Attorney, Agent, or Firm* — Studebaker Brackett PLLC (57) ABSTRACT

Provided are a guide pad having sufficient strength and a gun drill having the guide pad. A guide pad includes: a first surface; a second surface that is a flat surface located at a position opposed to the first surface; and a third surface that connects the first surface and the second surface to each other. When viewed along a rotational center axis, the first surface is a circular-arc-shaped surface, and when a point at which a virtual line passing through a circular-arc center of the first surface and perpendicular to the second surface and the second surface cross each other is assumed as a first point and a point at which a central axis of the through hole and the second surface cross each other is assumed as a second point, the first point is located at a position closer to the third surface than the second point.

6 Claims, 6 Drawing Sheets

(56) References Cited

U.S. PATENT DOCUMENTS

2013/0149057 A1\* 6/2013 Nisikawa ............ B23B 51/0054
                                                        408/83
2022/0001465 A1   1/2022 Shikama

FOREIGN PATENT DOCUMENTS

| JP | H10-505548 A    | 6/1998  |
| JP | 2008-254089 A   | 10/2008 |
| JP | 6849136 B1      | 3/2021  |
| WO | 2021/162198 A1  | 8/2021  |

\* cited by examiner

GUIDE PAD AND GUN DRILL HAVING GUIDE PAD

BACKGROUND

Field

The present invention relates to a guide pad and a gun drill having the guide pad.

Description of Related Art

As a tool used to form a deep hole having a small diameter, a gun drill has been known. The gun drill has a cutting edge at the leading end portion of a slender body. Generally, one cutting edge is provided, or a plurality of cutting edges are provided at positions asymmetrical around a rotational center axis. Further, as described in U.S. Pat. No. 6,849,136, guide pads are provided at the leading end portion of the body of a gun drill. In such a configuration, machining can be implemented in such a manner that a force is generated in a biased direction in a cutting edge and received by the guide pad. Since the guide pad abuts on the inner surface of a hole to be cut and the deformation or the like of the body due to the force is suppressed by the guide pad during machining, high-accuracy deep hole machining is made possible.

SUMMARY

The body of the gun drill is slender and therefore has a problem in securing strength during machining. Particularly, a tip-replaceable-type gun drill requires a recessed part used to attach a tip as well as a recessed part used to attach a guide pad in a body and therefore has a further difficulty in securing the strength of the body. It is assumed that the strength of the body is secured by, for example, thinning the guide pad as much as possible and increasing the thickness of the body correspondingly.

However, if the guide pad is excessively thinned, the strength of the guide pad reduces. Therefore, there is a possibility that the guide pad is damaged during machining. On the other hand, if the guide pad is thickened to sufficiently secure strength thereof, the strength of the body is also made insufficient. From the above reason, it is difficult to realize the machining of a hole having a much smaller diameter with a gun drill having a conventional configuration.

The present invention has an object of providing a guide pad having sufficient strength and a gun drill having the guide pad.

An aspect of the present invention provides a guide pad for a gun drill, the guide pad including: a first surface; a second surface that is a flat surface located at a position opposed to the first surface; and a third surface that connects the first surface and the second surface to each other, wherein a through hole used to insert and fasten a fastening member is formed so as to penetrate the guide pad from the first surface to the second surface. When viewed along a prescribed direction, the first surface is a circular-arc-shaped surface, and when a point at which a virtual line passing through a circular-arc center of the first surface and perpendicular to the second surface and the second surface cross each other is assumed as a first point and a point at which a central axis of the through hole and the second surface cross each other is assumed as a second point, the first point is located at a position closer to the third surface than the second point.

During machining, relatively large stress is applied to the portion of the guide pad held between the fastening member and a body, that is, the portion between the inner wall surface of the through hole and the third surface.

In the guide pad having the above configuration, the second point corresponding to the position of the through hole is located at a position farther than the first point when viewed from the third surface. Therefore, the distance between the inner surface of the through hole and the third surface is secured to be larger than a conventional configuration. That is, the portion to which stress is applied is thickened, and the strength of the portion is sufficiently secured. Thus, the above configuration of the guide pad makes it possible to sufficiently secure the strength of the guide pad during machining without increasing the thickness of the guide pad.

As a more preferred aspect, when viewed along the prescribed direction, the central axis of the through hole may be inclined with respect to the second surface so as to be gradually away from the third surface toward an outer peripheral side.

As a more preferred aspect, the guide pad may further include a fourth surface that is located at a position opposed to the third surface, and a portion of the fourth surface that is located near the through hole may be projected toward an opposite side to the through hole.

Another aspect of the present invention provides a gun drill having a guide pad, the guide pad including: a first surface that is a surface located on an outer peripheral side; a second surface that is a flat surface located at a position opposed to the first surface and is supported from an inside by a body of the gun drill; and a third surface that is, among surfaces connecting the first surface and the second surface to each other, a surface extending along a rotational center axis of the body and abutting on a part of the body, wherein a through hole used to insert and fasten a fastening member to the body is formed so as to penetrate the guide pad from the first surface to the second surface. When viewed along the rotational center axis of the body, the first surface is a circular-arc-shaped surface, and when a point at which a virtual line passing through a circular-arc center of the first surface and perpendicular to the second surface and the second surface cross each other is assumed as a first point and a point at which a central axis of the through hole and the second surface cross each other is assumed as a second point, the first point is located at a position closer to the third surface than the second point.

As described above, the gun drill having such a configuration is enabled to sufficiently secure the strength of the guide pad during machining without increasing the thickness of the guide pad. Since the gun drill does not require a deep recessed part used to attach the guide pad in the body, the strength of the body is not sacrificed.

As a more preferred aspect, the body may have a reinforcing wall that covers a leading end surface of the guide pad from a leading end side.

As a more preferred aspect, the body may have, on an outer peripheral side thereof, a groove used to guide a fluid toward the leading end side, and the groove may be formed so as to extend along an outer shape of the guide pad.

As a more preferred aspect, the guide pad may further include a fourth surface that is located at a position opposed to the third surface, and the groove may be formed so as to extend along the fourth surface.

As a more preferred aspect, a portion of the fourth surface that is located near the through hole may be projected toward an opposite side to the through hole, and the groove may be formed so as to extend along the fourth surface, with a part thereof being bent.

According to the present disclosure, a guide pad having sufficient strength and a gun drill having the guide pad are provided.

DETAILED DESCRIPTION

Hereinafter, the present embodiment will be described with reference to the accompanying drawings. In order to facilitate the understanding of the description, the same constituting elements in the respective drawings will be denoted by the same symbols as much as possible, and their duplicated descriptions will be omitted.

Figure 1:
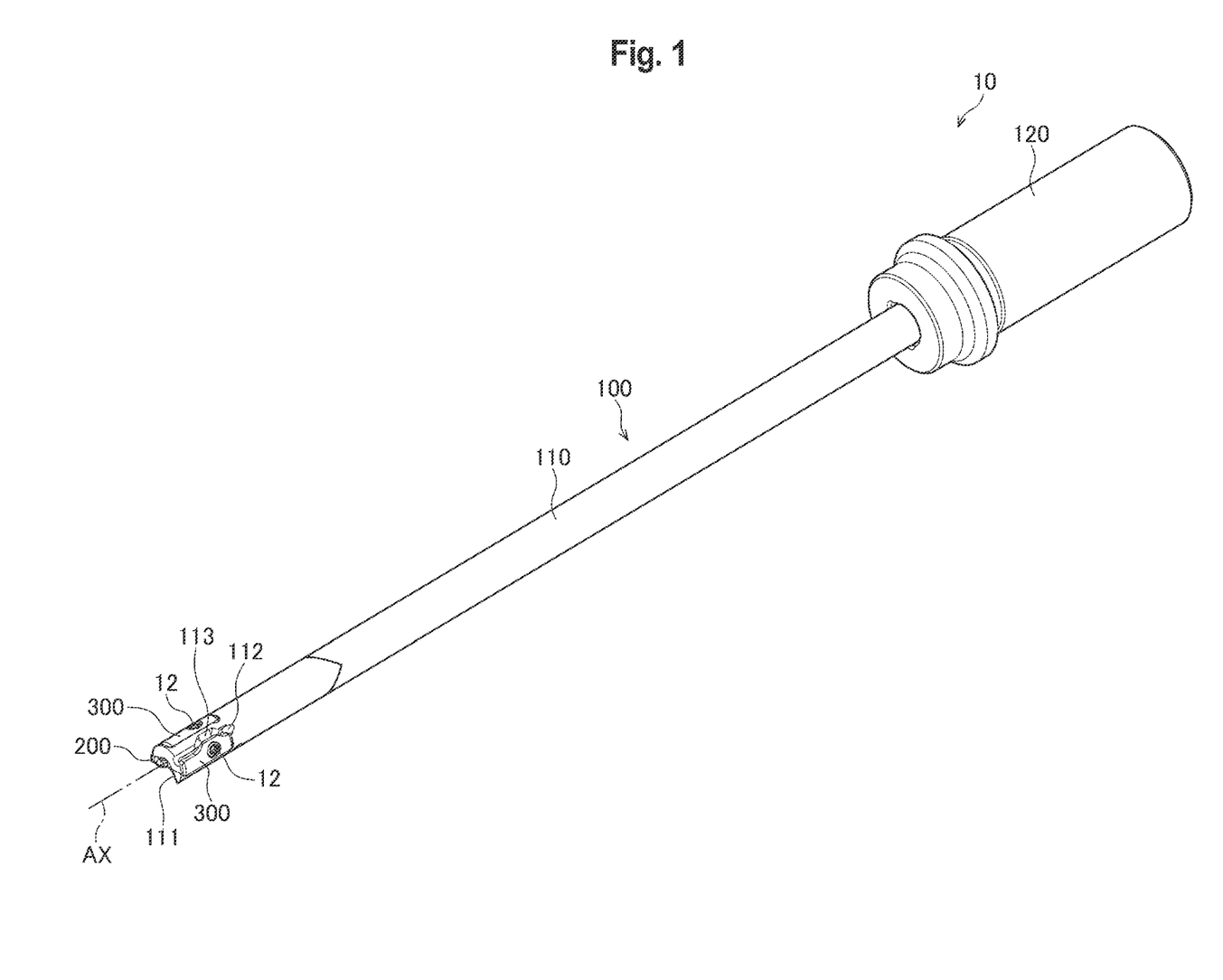
FIG. 1 is a perspective view showing the entire configuration of a gun drill according to the present embodiment.
Figure 2:
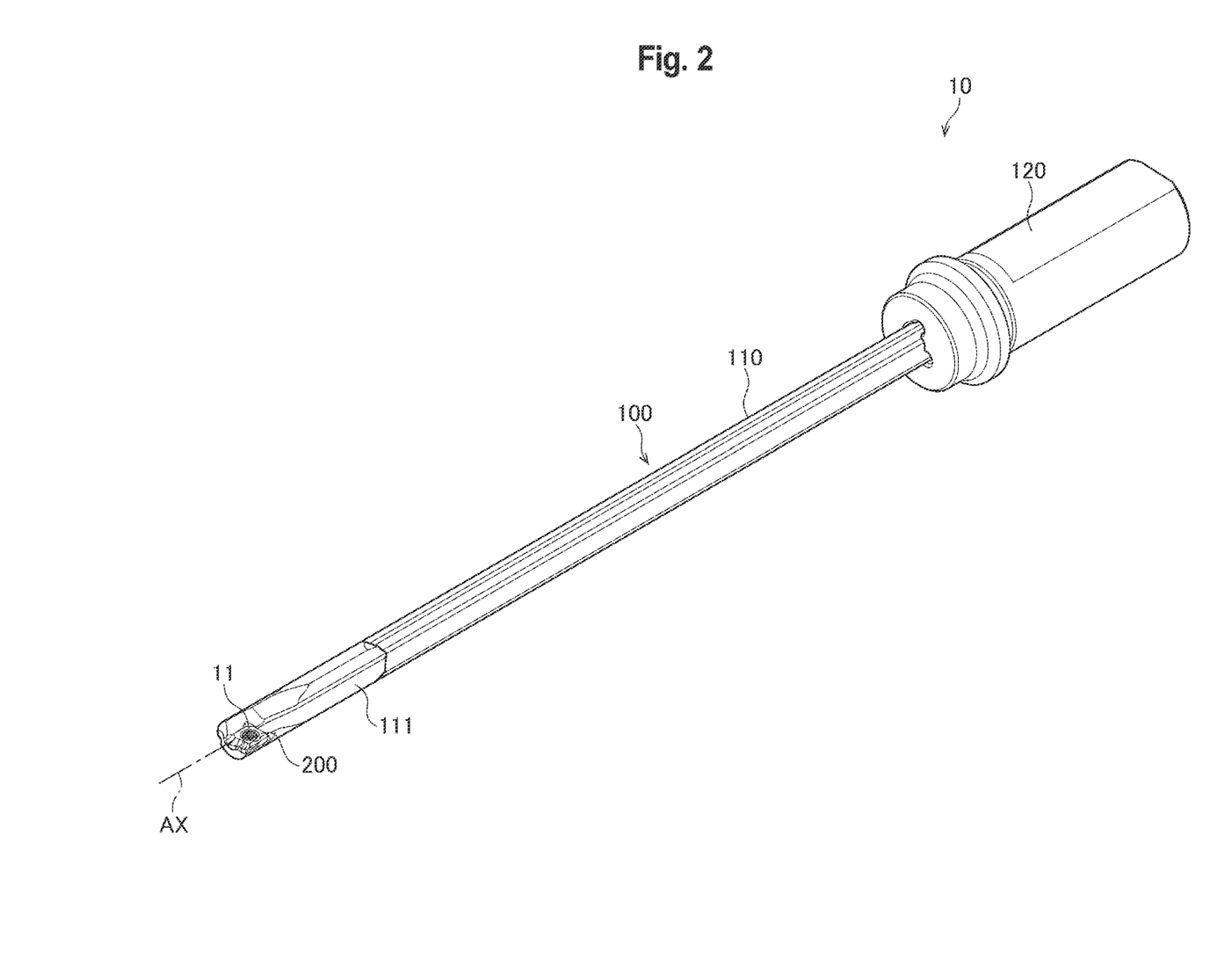
FIG. 2 is a perspective view showing the entire configuration of the gun drill according to the present embodiment.
Figure 3:
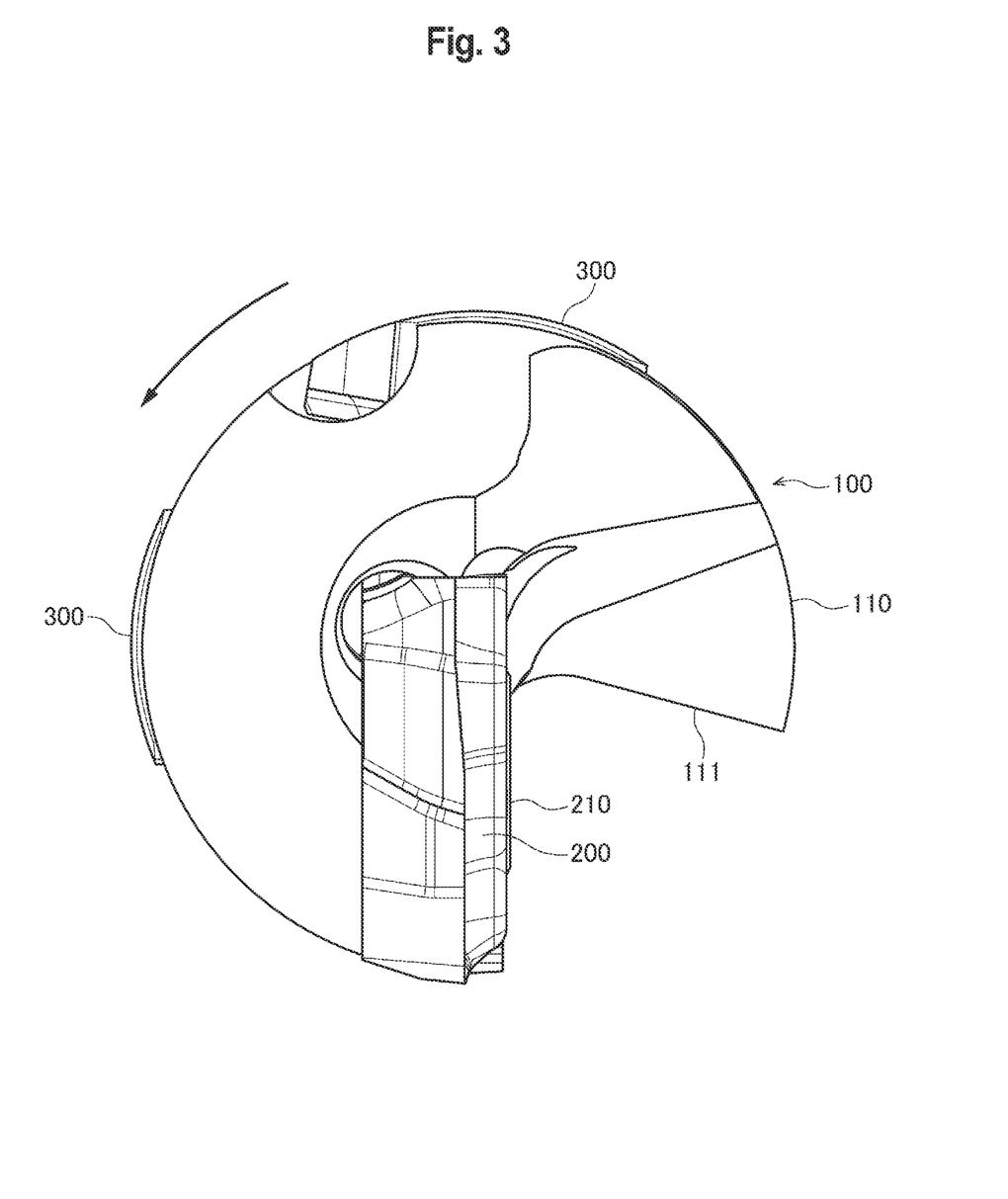
FIG. 3 is a view of the gun drill according to the present embodiment when viewed from a leading end side along its rotational center axis.
Figure 4:
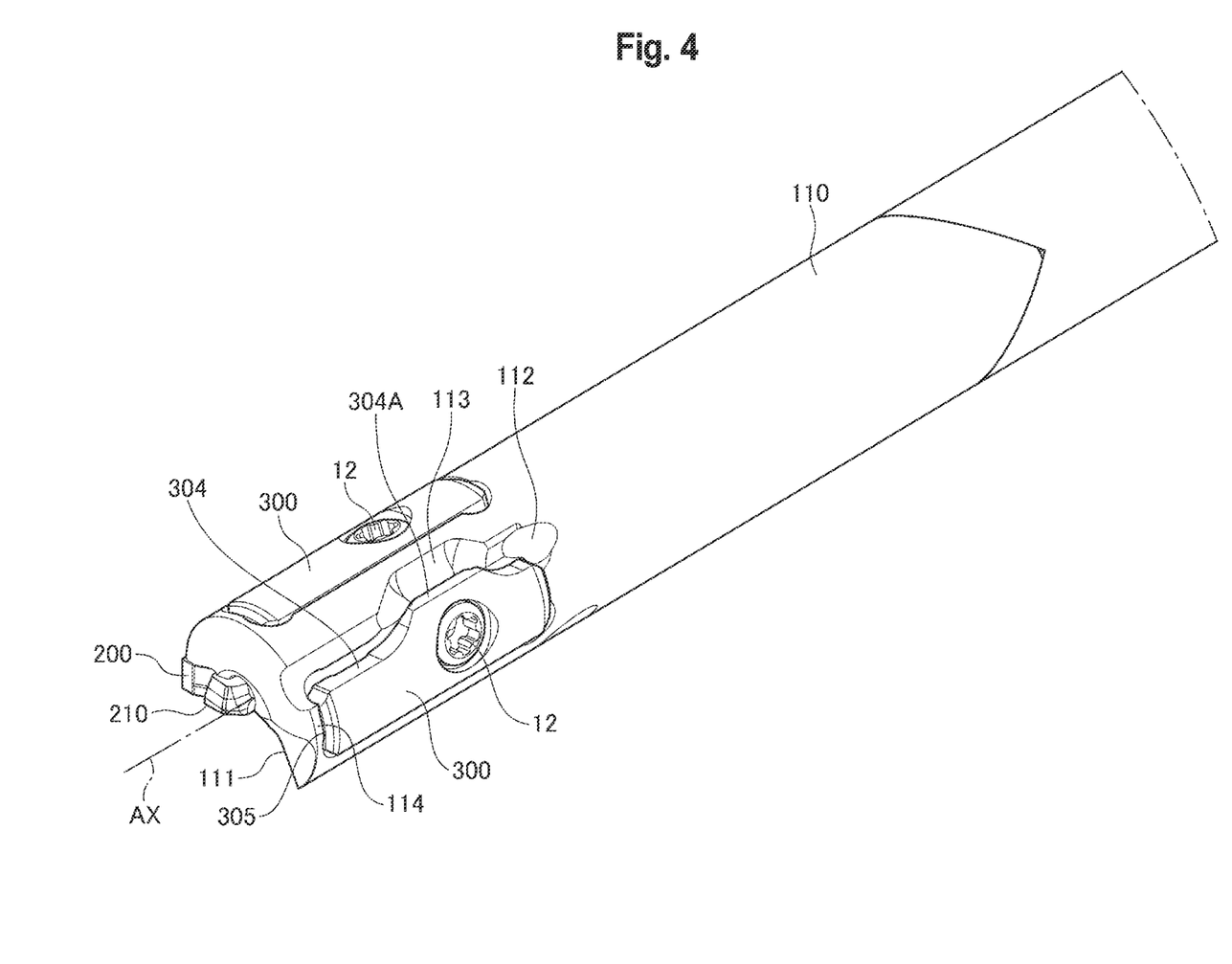
FIG. 4 is a view showing a part of FIG. 1 in an enlarged fashion.

The configuration of a gun drill 10 according to the present embodiment will be described. FIGS. 1 and 2 are perspective views showing the entire configuration of the gun drill 10. FIG. 3 is a view of the gun drill 10 of FIG. 1 when viewed from a leading end side along its rotational center axis AX. FIG. 4 is a view showing a part of FIG. 1, specifically, the leading end portion of the gun drill 10 in an enlarged fashion.

As shown in FIG. 1 or the like, the gun drill 10 includes a body 100, a cutting insert 200, and guide pads 300.

The body 100 is a member constituting substantially the entirety of the gun drill 10 and formed of steel. The body 100 has a part to be gripped 120 and a cutting part 110. The part to be gripped 120 is a portion that is located on one side along the longitudinal direction of the body 100 and gripped by a machine tool not shown.

For the convenience of the description, the end side of the body 100 on which the part to be gripped 120 is provided will also be called a "base end side" below. Further, the side opposite to the base end side will also be called a "leading end side" below.

The cutting part 110 is the portion of the body 100 that is located closer to the leading end side than the part to be gripped 120 and used to cut off a material to be cut. The cutting part 110 is formed so as to extend linearly from the part to be gripped 120 to the leading end side. As shown in FIG. 3, the cutting part 110 is formed in a substantially cylindrical shape and has a discharging groove 111 on its side surface. The discharging groove 111 is a groove that is used to guide and discharge a coolant during machining and formed so as to extend from the leading end side to the base end side. The coolant is a fluid supplied from a machine tool side during machining for the purpose of discharging chips, cooling, lubricating, and rustproofing a tool and a material to be cut, or the like.

The cutting insert 200 is a portion having a cutting edge 210 and formed of a carbide material. As shown in FIG. 2, the cutting insert 200 is fastened by a screw 11 at a position near the end on the leading end side of the inner surface of the discharging groove 111. The cutting edge 210 of the cutting insert 200 is further projected toward the leading end side from the leading end of the cutting part 110. During the machining of a material to be cut, the body 100 rotates about the rotational center axis AX. The rotating direction of the body 100 is a direction shown by an arrow in FIG. 3. When the body 100 rotates, a material to be cut is cut off by the abutment of the cutting edge 210 and a deep hole is formed in the material to be cut. The gun drill 10 according to the present embodiment has the cutting edge 210 as a replaceable separate part as described above and is constituted as a so-called "tip-replaceable-type" tool.

The body 100 of the gun drill 10 according to the present embodiment is a so-called "single-flute-type" tool, and only the one discharging groove 111 is formed. In order to correspond to the one discharging groove 111, the one cutting insert 200 is provided.

The guide pads 300 are members that are used to suppress the deformation or the like of the body 100 by abutting on the inner surface of a hole during machining. A hole formed in a material to be cut by the machining of the gun drill 10 will also be called a "machined hole" below. The provision of the guide pads 300 enables machining while maintaining the straightness or circularity of a machined hole.

When the cutting edge 210 is provided only at one spot in a circumferential direction like the present embodiment, a force in a biased direction is applied to the cutting edge 210 during machining. Therefore, the provision of the guide pads 300 at a position at which the force is receivable makes it possible to suppress the deformation or the like of the body 100 during machining and maintain the straightness or circularity of a machined hole as described above.

As shown in FIG. 4, the guide pads 300 are attached to the outer peripheral surface of the cutting part 110 at the position of the cutting part 110 that is located near the end on the leading end side. In the present embodiment, two guide pads 300 are provided and aligned along the circumferential direction. Each of the guide pads 300 is fastened to the cutting part 110 by a screw 12 serving as a fastening member. Note that the number of the guide pads 300 attached to the cutting part 110 may be only one or three or more.

As shown in FIG. 4, ejecting ports 112 and grooves 113 are formed near the portions of the cutting part 110 to which the guide pads 300 are attached.

The ejecting ports 112 are holes used to supply the coolant during machining. Inside the body 100, a flow path that is not shown and used to guide the coolant is formed. The end on one side of the flow path is opened at the end of the part to be gripped 120 on the base end side. The ejecting ports 112 are openings formed at the end on the other side of the flow path. During machining, the coolant is supplied from the machine tool to the flow path. The coolant is ejected from the ejecting ports 112 via the flow path and flows into the grooves 113 that will be described next.

The grooves 113 are grooves used to guide the coolant ejected from the ejecting ports 112 to the cutting edge 210 on the leading end side and formed along the outer peripheral surface of the cutting part 110. During machining, the coolant flows to the side of the cutting edge 210 via the space formed between the inner surfaces of the grooves 113 and the inner surface of a machined hole. After that, the coolant is discharged to the outside of the machined hole via the above-described discharging groove 111 together with chips caused by the machining.

Figure 5:
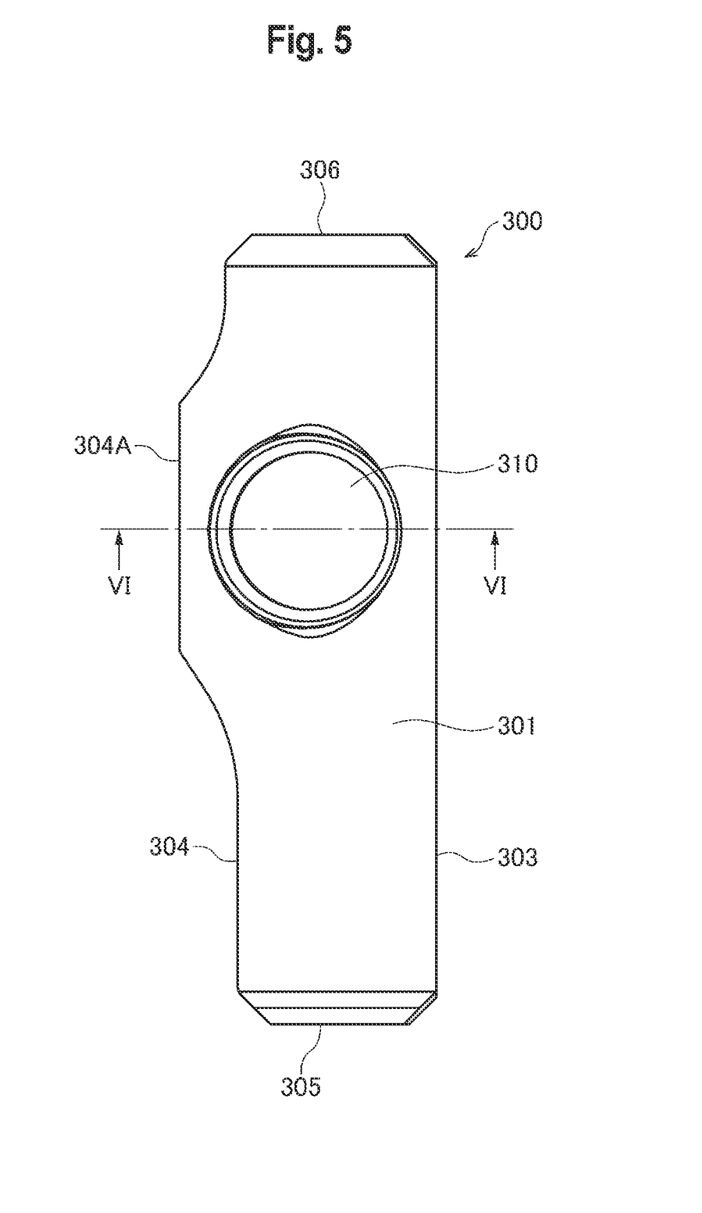
FIG. 5 is a view showing the configuration of a guide pad according to the present embodiment.
Figure 6:
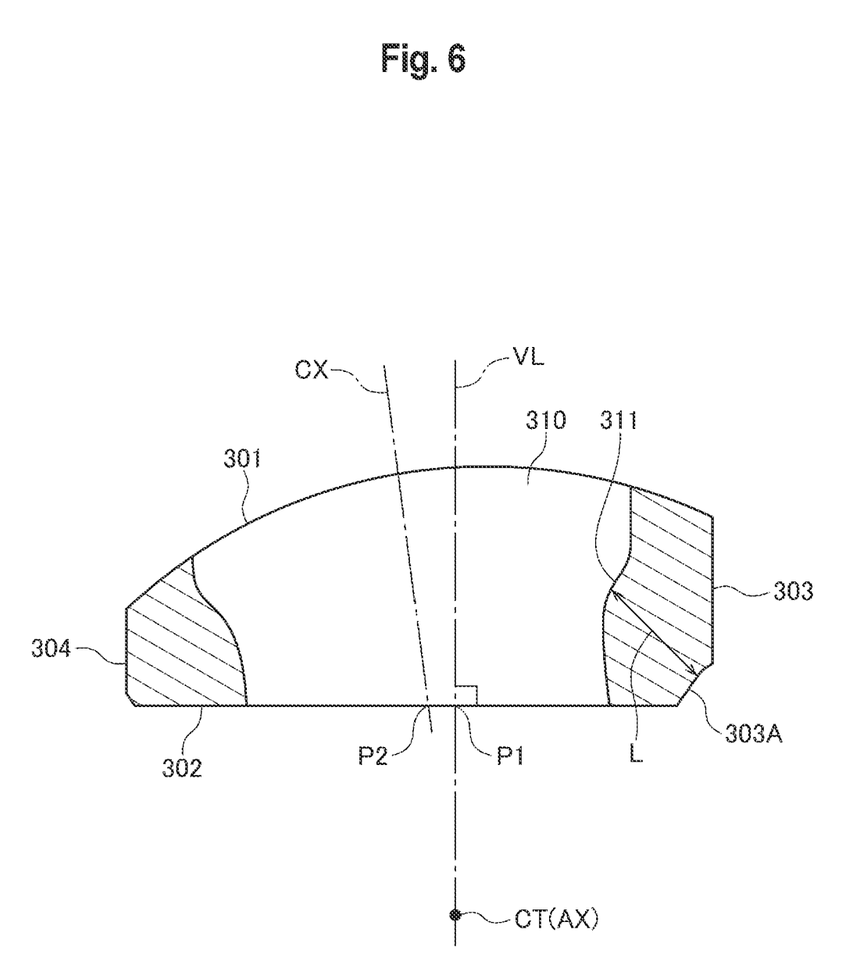
FIG. 6 is a view showing a cross-section taken along line VI-VI in FIG. 5.

The specific configuration of the guide pads 300 will be described. FIG. 5 shows the appearance of a guide pad 300 when viewed from its peripheral side. FIG. 6 shows a cross section taken along line VI-VI in FIG. 5. The cross section is a surface including a central axis CX of a through hole 310 that will be described later. In FIG. 5, a lower side corresponds to the leading end side, and an upper side corresponds to the base end side.

In FIG. 5, a part denoted by symbol "301" is a surface located on the outer peripheral side when the guide pad 300 is attached to the body 100, that is, a surface that is opposed to and abuts on the inner surface of a machined hole. The surface will also be called a "first surface 301" below. As shown in FIG. 6, the first surface 301 is a circular-arc-shaped surface in a view along the rotational center axis AX (in a view along a prescribed direction) when the guide pad 300 is attached to the body 100. The central axis CT (see FIG. 6) of the first surface 301 that is a circular-arc-shaped surface is an axis extending along the longitudinal direction of the body 100 and substantially agrees with the rotational center axis AX. Further, the curvature of the arc substantially equals the curvature of the inner surface of a machined hole.

In FIG. 6, a part denoted by symbol "302" is a surface that is located at a position opposed to the first surface 301, that is, a surface that is located on the rear side of the first surface 301 and supported by the cutting part 110 from the inside. The surface will also be called a "second surface 302" below. The second surface 302 is a flat surface.

In FIG. 5, a part denoted by symbol "303" is one of surfaces connecting the first surface 301 and the second surface 302 to each other, and is a surface extending along the rotational center axis AX on the right side of FIG. 5. The surface will also be called a "third surface 303" below.

In FIG. 5, a part denoted by symbol "304" is a surface located at a position opposed to the third surface 303. The surface will also be called a "fourth surface 304" below. As shown in FIG. 5, the third surface 303 is a flat surface in its almost entirety, while the fourth surface 304 is formed in a shape partially projected (at a portion denoted by symbol "304A"). The portion will also be called a "projected part 304A" below. The projected part 304A is a portion of the fourth surface 304 that is located near the through hole 310 that will be described later, and is projected toward the side opposite to the through hole 310.

In FIG. 5, a part denoted by symbol "305" is one of the surfaces connecting the first surface 301 and the second surface 302 to each other, and is the surface of the guide pad 300 that is located closest to the leading end side. The surface will also be called a "leading end surface 305" below.

In FIG. 5, a part denoted by symbol "306" is one of the surfaces connecting the first surface 301 and the second surface 302 to each other, and is the surface of the guide pad 300 that is located closest to the base end side. The surface will also be called a "base end surface 306" below.

The guide pad 300 has the through hole 310. The through hole 310 is a hole used to insert and fasten the screw 12 to the cutting part 110, and is formed so as to penetrate the guide pad 300 from the first surface 301 to the second surface 302.

The through hole 310 is a substantially circular hole, but its inner diameter is not entirely the same. As shown in FIG. 6, the inner surface of the through hole 310 has a tapered part 311. An inner diameter from the tapered part 311 to the side of the first surface 301 is larger than an inner diameter from the tapered part 311 to the side of the second surface 302. It can be said that the tapered part 311 is a portion at which the inner diameter of the through hole 310 gradually reduces from an outer peripheral side to an inner peripheral side (the side of the body 100). The tapered part 311 is a portion to which a force from the screw 12 is applied when the guide pad 300 is fastened.

In FIG. 6, a part denoted by symbol "CX" is the central axis of the through hole 310. The central axis will also be called a "central axis CX" below. In a cross section perpendicularly cut off with respect to the central axis CX, the center of a circle showing the through hole 310 and the central axis CX agree with each other. Note that in a case in which the cross-sectional shape of the through hole 310 is not an accurate circular shape or the like, an axis agreeing with the central axis of the screw 12 in a state in which the screw 12 is inserted into and fastened to the through hole 310 may be defined as the "central axis CX of the through hole 310".

As shown in FIG. 6, the central axis CX in the present embodiment is inclined with respect to the second surface 302 so as to be away from the third surface 303 toward the outer peripheral side (the upper side of FIG. 6) when viewed along the rotational center axis AX.

When the screw 12 is inserted into the through hole 310 and fastening is performed by the screw 12, the guide pad 300 is fastened to the cutting part 110 while receiving a force directed to the right side and the upper side of FIG. 5. In other words, the inner surface of the through hole 310 is formed so that the above force is applied during fastening.

Although omitted in the figures, a first positioning part that abuts on the third surface 303 during fastening and a second positioning part that abuts on the base end surface 306 during fastening are provided in the cutting part 110. Since the above force is applied to the guide pad 300 when fastening is performed by the screw 12, the third surface 303 and the base end surface 306 of the guide pad 300 abut on the first positioning part and the second positioning part, respectively. As a result, the guide pad 300 is positioned and attached to an appropriate position by these two surfaces.

In a state in which fastening is completed, the portion between a part (particularly, a chamfered portion denoted by symbol 303A in FIG. 6) of the third surface 303 and the tapered part 311 is held between the screw 12 and the cutting part 110, and relatively large stress is applied to the portion.

Meanwhile, the body 100 of the gun drill 10 used in the machining of a deep hole is slender and therefore has a problem in securing strength during the machining. Particularly, a tip-replaceable-type gun drill like the present embodiment requires a recessed part used to attach the cutting insert 200 as well as a recessed part used to attach the guide pad 300 in the body 100 and therefore the body 100 has a further difficulty in securing strength. It is assumed that the strength of the body 100 is secured by, for example, thinning the guide pad 300 as much as possible and increasing the thickness of the body 100 correspondingly.

However, if the guide pad 300 is excessively thinned, the strength of the guide pad 300 reduces. Therefore, there is a possibility that the guide pad 300 is damaged during machining particularly at a portion to which stress due to fastening is applied as described above or in the vicinity of the portion. On the other hand, if the guide pad 300 is thickened to sufficiently secure its strength, a recessed part to be formed in the body 100 becomes deep, which also makes the strength of the body 100 insufficient.

In view of this, the position or the like of the through hole 310 is devised in the guide pad 300 according to the present embodiment, which makes it possible to sufficiently secure the strength of the guide pad 300 during machining without increasing the thickness of the guide pad 300.

The above devising will be continuously described with reference to FIG. 6. A virtual line VL shown in FIG. 6 is a virtual line that passes through the circular-arc center (that is, the central axis CT) of the first surface 301 showing a circular-arc-shaped surface and that is drawn so as to be perpendicular to the second surface 302. In the cross section of FIG. 6, a point at which the virtual line VL and the second surface 302 cross each other will also be called a "first point P1" below. Further, in the cross section of FIG. 6, a point at which the central axis CX of the through hole 310 and the second surface 302 cross each other will also be called a "second point P2" below.

In a case in which the first point P1 and the second point P2 are defined as described above, the first point P1 is located at a position closer to the third surface 303 than the second point P2 in the present embodiment. In other words, the second point P2 corresponding to the position of the through hole 310 is located at a position farther than the first point P1 when viewed from the third surface 303.

In a conventional configuration, the guide pad 300 is formed in a shape symmetrical with respect to the through hole 310. Therefore, the position of the first point P1 and the position of the second point P2 that are defined as described above agree with each other in a cross section like FIG. 6. On the other hand, the second point P2 is located at the position farther than the first point P1 when viewed from the third surface 303 as described above in the present embodiment. As a result, a distance L from the tapered part 311 to the portion of the third surface 303 that is denoted by symbol 303A is secured to be larger in the present embodiment than the conventional configuration. That is, the portion of the guide pad 300 to which relatively large stress is applied by fastening is thicker than before. Thus, the strength of the portion is sufficiently secured.

As described above, it is possible to sufficiently secure the strength of the guide pad 300 during machining by devising of the position or the like of the through hole 310 without increasing the thickness of the guide pad 300 in the present embodiment.

Further, the central axis CX of the through hole 310 is inclined with respect to the second surface 302 in the present embodiment as described above. Accordingly, compared with a configuration in which the central axis CX extends parallel to the virtual line VL from the position of the second point P2, the distance L is secured to be larger, which further increases the strength of the guide pad 300.

As described above with reference to FIG. 5, the portion (projected part 304A) of the fourth surface 304 that is located near the through hole 310 is projected toward the side opposite to the through hole 310 in the present embodiment. Thus, since the thickness of the portion of the guide pad 300 that is located on the left side of the through hole 310 in FIG. 5 is sufficiently secured, the portion is prevented from being excessively thinned.

Another devising point will be described. As shown in FIG. 4, a reinforcing wall 114 is formed near the end of the cutting part 110 on the leading end side. The reinforcing wall 114 is a wall provided so as to be projected toward the outer peripheral side at a position adjacent to the guide pad 300. The reinforcing wall 114 covers the leading end surface 305 of the guide pad 300 from the leading end side. The provision of the reinforcing wall 114 secures strength at the portion of the cutting part 110 on the leading end side.

As described above with reference to FIG. 4, the grooves 113 used to guide the coolant toward the leading end side are formed on the outer peripheral surface of the cutting part 110. As shown in FIG. 4, the grooves 113 are formed so as to extend along the outer shapes of the guide pads 300, specifically, the fourth surfaces 304 of the guide pads 300. Each of the grooves 113 is formed so as to extend with its part bent in order to follow the shape of the fourth surface 304 partially projected (at the projected part 304A). The grooves 113 are located and shaped in this manner, whereby a reduction in the rigidity of the body 100 accompanied by the formation of the grooves 113 is minimized.

The present embodiment is described above with reference to the specific examples. However, the present disclosure is not limited to these specific examples. Modifications obtained when persons skilled in the art appropriately make a change to the specific examples are also included in the range of the present disclosure so long as the modifications include the characteristics of the present disclosure. The respective elements and their arrangement, conditions, shapes, or the like included in the respective specific examples described above are not limited to the illustrated ones but may be appropriately modified. The respective elements included in the respective specific examples described above may be appropriately combined together so long as no technical contradiction arises.

What is claimed is:

1. A guide pad for a gun drill, the guide pad comprising:
a first surface;
a second surface that is a flat surface located at a position opposed to the first surface;
a third surface that connects the first surface and the second surface to each other; and
a fourth surface that is located at a position opposed to the third surface, wherein
a through hole used to insert and fasten a fastening member is formed so as to penetrate the guide pad from the first surface to the second surface, and
in a cross-section view in a direction traversing from the third surface to the fourth surface,
the first surface is a circular-arc-shaped surface,
a first point is a point at which a virtual line passing through a circular-arc center of the first surface and a plane defined by the second surface intersect perpendicularly,
a second point is a point at which a central axis of the through hole and the plane defined by the second surface cross each other,
the first point is located at a position closer to the third surface than the second point, and
the central axis of the through hole is inclined with respect to the second surface so as to be gradually away from the third surface in a direction from the second surface to the first surface.

2. The guide pad according to claim 1, wherein
a portion of the fourth surface that is located near the through hole is projected toward an opposite side to the through hole.

3. A gun drill having a guide pad, the guide pad comprising:
a first surface that is a surface located on an outer peripheral side of the gun drill;

a second surface that is a flat surface located at a position opposed to the first surface and is supported from an inside by a body of the gun drill; and a third surface that is, among surfaces connecting the first surface and the second surface to each other, a surface extending along a rotational center axis of the body and abutting on a part of the body, wherein a through hole used to insert and fasten a fastening member to the body is formed so as to penetrate the guide pad from the first surface to the second surface, and when viewed along the rotational center axis of the body, the first surface is a circular-arc-shaped surface,
- a first point is a point at which a virtual line passing through a circular-arc center of the first surface and a plane defined by the second surface intersect perpendicularly;
- a second point is a point at which a central axis of the through hole and the plane defined by the second surface cross each other, and
- the first point is located at a position closer to the third surface than the second point, the body has, on an outer peripheral side thereof, a groove used to guide a fluid toward a leading end side, and the groove is formed so as to extend along an entire outer shape of the guide pad.

4. The gun drill according to claim 3, wherein the body has a reinforcing wall that covers a leading end surface of the guide pad from a leading end side.

5. The gun drill according to claim 3, wherein the guide pad further includes a fourth surface that is located at a position opposed to the third surface, and the groove is formed so as to extend along the fourth surface.

6. The gun drill according to claim 5, wherein a portion of the fourth surface that is located near the through hole is projected toward an opposite side to the through hole, and the groove is formed so as to extend along the fourth surface, with a part of the groove being bent.

\* \* \* \* \*